United States Patent [19]

Kerres

[11] 4,416,782

[45] Nov. 22, 1983

[54] METHOD FOR SEPARATING OIL FROM AQUEOUS OR SOLVENT DISPERSIONS

[75] Inventor: Bruno Kerres, Nettetal, Austria

[73] Assignee: Girmes-Werke AG, Fed. Rep. of Germany

[21] Appl. No.: 359,190

[22] Filed: Mar. 18, 1982

Related U.S. Application Data

[63] Continuation of Ser. No. 215,371, Dec. 11, 1980, abandoned.

[30] Foreign Application Priority Data

Dec. 12, 1979 [EP] European Pat. Off. ........ 79105115.4

[51] Int. Cl.³ .............................................. B01D 17/04
[52] U.S. Cl. ..................................... 210/634; 210/693;
210/708; 210/799; 210/483; 210/502.1;
210/505; 210/DIG. 5
[58] Field of Search ............... 210/693, 799, 505, 508,
210/509, 500.1, 513, 483, 495, 496, 924, DIG. 5,
634, 636, 708, 488, 489

[56] References Cited

U.S. PATENT DOCUMENTS

| | | | |
|---|---|---|---|
| 2,405,838 | 8/1946 | Lawson | 210/DIG. 5 |
| 3,016,345 | 1/1962 | Price | 210/DIG. 5 |
| 3,018,845 | 1/1962 | Powers | 210/505 |
| 3,219,194 | 11/1965 | Schwartzwalder | 210/505 |
| 3,231,091 | 1/1966 | Kingsbury | 210/DIG. 5 |
| 3,246,767 | 4/1966 | Pall | 210/505 |
| 3,268,442 | 8/1966 | Pall | 210/799 |
| 3,667,608 | 6/1972 | Burroughs | 210/924 |
| 3,748,682 | 7/1973 | Rhodes | 210/924 |
| 3,794,583 | 2/1974 | Rhodes | 210/DIG. 5 |
| 3,881,211 | 5/1975 | Rhodes | 210/924 |
| 3,960,722 | 6/1976 | Tomikawa | 210/693 |
| 4,057,493 | 11/1977 | Davies | 210/799 |
| 4,058,456 | 11/1977 | Head | 210/650 |
| 4,107,051 | 8/1978 | Lorentzen | 210/924 |
| 4,167,482 | 9/1079 | Muller | 210/799 |
| 4,284,507 | 8/1981 | Beane | 210/435 |

FOREIGN PATENT DOCUMENTS

| | | | |
|---|---|---|---|
| 30569 | 6/1981 | European Pat. Off. | 210/DIG. 5 |
| 2755837 | 6/1979 | Fed. Rep. of Germany | 210/DIG. 5 |
| 51-12030 | 4/1976 | Japan | 210/799 |
| 1187605 | 4/1970 | United Kingdom | 210/924 |

*Primary Examiner*—Ernest G. Therkorn
*Attorney, Agent, or Firm*—Thomas J. Greer, Jr.

[57] ABSTRACT

For separating oil from aqueous or solvent dispersions the dispersion is passed through a porous flat-shaped textile article which comprises at least partly of oleophilic fibres each having a titer below 1 dtex. The flat-shaped textile article is preferably a three dimensional article, and can have a pile and possibly also a substrate comprising of extremely fine oleophilic artificial fibres. The pile threads and eventually also the threads of the substrate are split by means of a swelling agent into many extremely fine oleophilic fibres having a low titer. The small and very small oil drops in the dispersion are withheld on the extremely fine oleophilic fibres and coalesce to larger oil droplets or oil drops which rise to the surface of the liquid due to their lower density than the liquid. The oil can be easily removed from the surface of the liquid.

7 Claims, 1 Drawing Figure

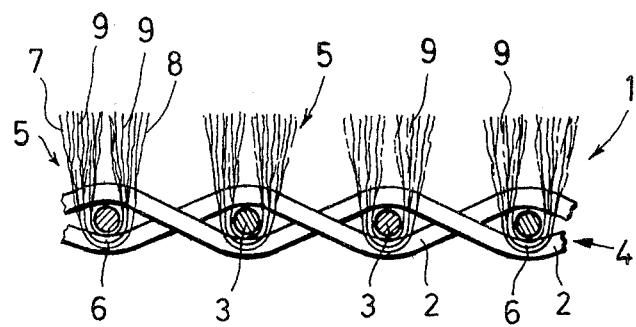

METHOD FOR SEPARATING OIL FROM AQUEOUS OR SOLVENT DISPERSIONS

This is a continuation of application Ser. No. 215,371, filed Dec. 11, 1980 now abandoned.

FIELD OF THE INVENTION

The invention relates to a method for separating oil from aqueous or solvent dispersions. Furthermore, the invention relates to a device for separating oil from aqueous or solvent dispersions.

BACKGROUND OF THE INVENTION

Up to date, it has not been possible to remove by mechanical means like filters or centrifuges oil from water which is distributed within the water in the form of very small oil droplets having a diameter of about 1 to 30 microns and especially having a diameter below 10 microns. The problem is that such extremely fine oil droplets are suspended in the liquid and dispite their lower density than the density of the liquid, do not or do not within a satisfactory time period rise to the surface of the liquid and especially not if the liquid contains surface active substances. If the oil content of waste water is to be reduced or if stabilized oil-in-water dispersions like coolants for machining metals have to be cleaned from other oils which have contaminated them, it must be possible to separate such fine or extremely fine oil droplets.

OBJECT OF THE INVENTION

It is an object of the invention to have oil which is extremely finely distributed in liquids rise within time periods which are of interest for the technical practice, to the surface of the liquid from where the oil can be removed with known or common techniques.

DESCRIPTION OF THE INVENTION

For separating oil from aqueous or solvent dispersions it is proposed in accordance with the present invention to pass the contaminated dispersion through a porous flat-shaped textile article which at least partly comprises of extremely fine oleophilic fibres each having a titer below 1 dtex. Thus, the fine and extremely fine oil droplets coalesce or agglomerate at the flat-shaped textile article to larger oil drops which are not held suspended within the liquid but rise in view of their lower density quickly to the surface of said liquid where they are combined with further oil drops to an oil film, so that they can be removed, for instance, by mechanical means like centrifuges.

Furthermore, the invention provides a device having a porous, for instance three dimensional, flat-shaped textile article which comprises at least partly of extremely fine oleophilic artificial fibres. The extremely fine oleophilic fibres, threads or filaments mentioned here are those which each have a titer or denier below 1 dtex and preferably a titer between 0.05 dtex and about 0.5 dtex.

Threads of this kind are for instance produced by spinning different synthetic polymers of for instance polyamide and polyethylene terephthalate together in a certain cross sectional distribution or with a matrix distribution in the cross section from a spinng jet as molten polymers to threads each having a titer or denier above 1 dtex. From material of said kind a textile flat-shaped article is produced. Said article is subjected to a chemical treatment, for instance with a swelling agent, so that the fibres or threads are split into many individual fibres or threads having a smaller titer.

The artificial fibres, threads or filaments mentioned herein are those made of synthetic material like resins or plastics.

A flat-shaped textile article within the scope of the present invention is for instance a flat woven fabric, a homogeneous fibre fleece, a felt, a knitted fabric or the like. A three dimensional flat-shaped textile article within the scope of the present invention is an article which has at least on one side of a flat substrate like a woven or knitted fabric, a felt or the like, a fibre layer like for instance a fibre nap, a pile comprising of fibres or threads or the like. Such three dimensional flat-shaped textile article can be a fleece, a knitted pile fabric, a raschel knitted pile fabric or even a woven pile fabric. It is of importance that those three dimensional textile articles have a certain porosity as well as simple flat-shaped textile articles so that the liquid dispersion can be passed through the article for treatment such that only the oil which is to be separated from said dispersion is withheld while the remainder of the dispersion passes through the article.

The flat-shaped textile articles of the present invention have—contrary to pile fabric made from usual fibres—the unexpected property to withhold by passing for instance oil-in-water dispersions without large pressure losses oil droplets contained in said dispersions at the extremely fine fibres so that extremely small oil droplets are combined to larger oil drops which, after they have reached a certain diameter, are released from the textile fibre material and rise due to the lower density of the oil quickly to the surface of the liquid, where they form an oil layer or oil film which can be removed easily. The coalescence of extremely fine oil droplets to larger droplets or drops which by themselves rise to the surface of the liquid, which is necessary for effectively separating oils from aqueous or other dispersions, is obtained with the device of the present invention in that the oil droplets which are suspended in the dispersion and do not or only very slowly rise to the surface of the liquid by themselves are first withheld by the extremely fine fibres of the for instance three dimensional flat-shaped article and, after they have agglomerated to larger drops or droplets, are released from the fibre layer and rise quickly to the surface of the liquid. Therefore, the surface of the fibres of the flat-shaped textile article which is used as a "filter" is automatically always cleaned from oil agglomerations, so that the fibre layer is automatically cleaned and always prepared for new coalescing actions.

DESCRIPTION OF THE DRAWINGS

In the single FIGURE of the drawings one example of a device for separating oil from aqueous dispersions is schematically shown in cross section and in extremely enlarged representation.

The device comprises a three dimensional flat-shaped textile article 1 in form of a cut pile fabric which has a woven substrate 4 comprising of intercrossing threads 2 and 3, and pile naps 5 which are woven into said substrate 4.

Each pile nap 5 comprises one thread 6, which is, in the embodiment of the drawing, U-shaped and is bound to the substrate 4. The upstanding ends 7 and 8 of each thread 6 are split by means of chemical treatment, for instance with a swelling agent, to fine or extremely fine fibres 9. The extremely fine individual fibres 9 each have a titer below 1 dtex and preferably a titer between 0.05 dtex and about 0.5 dtex. They have oleophilic properties, i.e. oil has a certain affinity to such fibres even if it is suspended in extremely fine distribution in a dispersion, so that especially extremely small oil droplets accumulate to the individual fibres 9 until, by accumulation of further extremely small oil droplets, they have formed larger droplets or drops which do not stay in suspension in the dispersion but are separated from the fibres 9 due to the density of oil which is lower than that of the liquid and which quickly rise to the surface of said liquid. Also, the threads 2 and 3 which form the rear side of the article 1 can comprise of the above described extremely fine thread or fibre material.

In a specific embodiment of the invention it has been found that the illustrated three dimensional flat-shaped textile article in the form of a cut pile fabric, with the pile and the substrate thereof comprising of extremely fine oleophilic fibres and for instance having twelve pile naps per centimeter length in transverse direction and six pile naps per centimeter in length direction wherein the pile length over the substrate is six mm, and the total pile length about 12 mm, is suitable for effectively separating also extremely fine and extremely small oil droplets from aqueous or solvent dispersions. The droplets are withheld at the pile side and the rear side or under side of the three dimensionsal flat-shaped article where they coalesce to larger drops or droplets which rise to the surface of the liquid. The dispersions from which oil residues are to be separated are passed through the three dimensional flat-shaped articles from one side to the other thereof to "filter" the dispersions and thereby to remove oil residues.

To obtain the necessary inherent stability the flat-shaped textile article 1 is arranged on a not shown support such as a tube, a hose, a ceramic sleeve or the like, and is comprised at least partly of extremely fine fibres 9. Also the threads 2 and 3 of the substrate 4 can be split to individual fibres 9.

Usually, a pile fabric is to be preferred instead of a flat woven fabric since a pile fabric builds up a lower counter pressure against a liquid passing through it than a flat woven fabric which produces the same coalescence.

It is claimed:

1. A method for separating oil from oil bearing aqueous or solvent liquid dispersions wherein the oil has a lower density than the liquid dispersions, said method being characterized in that an oil containing liquid disperson is passed through a porous textile flat-shaped article having upstanding free ended piles formed at least partly of oleophilic fibers each having a titer between 0.05 and about 0.5 dtex whereby very small oil drops having a diameter of about 1 to 30 microns in the dispersions are withheld on the oleophilic fibers and coalesce to larger oil droplets which rise to the surface of the liquid dispersions due to their lower density than the liquid dispersions, the said porous textile article being thereby continuously and automatically cleaned by said coalescence from oil agglomerations, so that the fibers are always prepared for new coalescing actions.

2. An apparatus for separating oil from oil bearing aqueous or solvent liquid dispersions, said apparatus comprising a filter device and means for delivering an oil bearing dispersion through said filter device in a predetermined direction, said filter device being characterized in that it comprises a porous textile flat-shaped article having upstanding free ended piles extending in the direction of dispersion flow and for receiving dispersions, said piles being formed at least partly of oleophilic article fibers each having a titer between about 0.05 and about 0.5 dtex whereby very small oil drops having a diameter of about 1 to 30 microns in liquid dispersions are withheld on the oleophilic fibers and coalesce to larger oil droplets which rise to the surface of a liquid dispersion due to their lower density than the liquid dispersions, the said porous textile article being thereby continuously automatically cleaned by said coalescence from oil agglomerations, so that the fibers are always prepared for new coalescing actions, and means for withdrawing separately the separated oil and the remaining liquid.

3. A device as claimed in claim 2, characterized in that said fibers are in the form of a fiber fleece.

4. A device as claimed in claim 2, characterized in that said flat-shaped textile article is a knitted or raschel knitted pile fabric.

5. A device as claimed in claim 4, characterized in that said piles of said pile fabric are formed of extremely fine oleophilic fibers.

6. A device as claimed in claim 2, characterized in that said flat-shaped textile article is a flat woven fabric having one or more woven layers.

7. A device as claimed in claim 2, characterized in that said flat-shaped textile article is a flat knitted fabric having one or more knitted layers.

* * * * *